United States Patent
Lauka et al.

(10) Patent No.: US 10,592,962 B1
(45) Date of Patent: Mar. 17, 2020

(54) SYSTEMS AND METHODS FOR PARALLELIZING CUSTOMER INPUT WITH REAL-TIME PICKING FOR ITEM SUBSTITUTIONS

(71) Applicant: Amazon Technologies, Inc., Seattle, WA (US)

(72) Inventors: Wesley Scott Lauka, Seattle, WA (US); Julia Hannah Blum, Seattle, WA (US); Taylor Wayne Andrus, Seattle, WA (US); Trevor Joseph Allred, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 789 days.

(21) Appl. No.: 15/192,469

(22) Filed: Jun. 24, 2016

(51) Int. Cl.
  *G06Q 30/00* (2012.01)
  *G06Q 30/06* (2012.01)
  *H04W 4/02* (2018.01)
  *H04W 4/12* (2009.01)
  *G06K 19/06* (2006.01)
  *G06K 7/10* (2006.01)
  *G06K 19/077* (2006.01)

(52) U.S. Cl.
  CPC ..... *G06Q 30/0633* (2013.01); *G06K 7/10861* (2013.01); *G06K 7/10881* (2013.01); *G06K 19/06037* (2013.01); *G06K 19/07758* (2013.01); *H04W 4/02* (2013.01); *H04W 4/12* (2013.01)

(58) Field of Classification Search
  CPC ......... G06Q 10/08–0875; G06Q 30/06; G06Q 30/0601–0643; G06Q 30/08
  See application file for complete search history.

(56) References Cited

U.S. PATENT DOCUMENTS

| | | | | |
|---|---|---|---|---|
| 2015/0081466 | A1* | 3/2015 | Sakurai | G06Q 10/087 705/26.1 |
| 2016/0148302 | A1* | 5/2016 | Carr | G06Q 30/0635 705/26.81 |
| 2017/0018139 | A1* | 1/2017 | Skoler | G06Q 30/0242 |
| 2017/0124637 | A1* | 5/2017 | Ouchi | G06Q 30/0643 |
| 2017/0220986 | A1* | 8/2017 | Putcha | G06Q 10/087 |

OTHER PUBLICATIONS

Design and Control of Warehouse Order Picking: a literature review Rene de Koster, Tho Le-Duc and Kees Jan Roodbergen (2007) (Year: 2007).*

* cited by examiner

*Primary Examiner* — William J Allen
(74) *Attorney, Agent, or Firm* — Lee & Hayes, P.C.

(57) ABSTRACT

Systems and methods for improving the efficiency of order fulfillment are disclosed. When fulfilling an order in which substitutions are required, due to unavailability of particular products, the process of contacting the customer and receiving a selection from the customer can be separated from the picking process. The picker can continue to fulfill the order, while an automated system offers alternatives and receives selections from the customer. If appropriate, the substitution can be appended to the picker's list. If the picker has completed the remainder of the order, on the other hand, a new order with the substitution can be created, which can later be aggregated with the original order. A variety of methods can be used to efficiently present substitutions to the customer and receive choices from the customer, including use of imagery of substitute items.

20 Claims, 10 Drawing Sheets

SYSTEMS AND METHODS FOR PARALLELIZING CUSTOMER INPUT WITH REAL-TIME PICKING FOR ITEM SUBSTITUTIONS

BACKGROUND

Online shopping systems exist that enable customers to order various items online for delivery within a specified time period. Customers can order groceries from a variety of local grocery stores, for example, and have their order delivered by courier within two hours. The order is often received by a central service provider online, processed, and then sent to a worker, or "picker," at the local store who physically retrieves the items off of the store's shelves.

The picker receives the list of items, physically removes the requested items from the shelves in the store, and places the items in a bag or bin for delivery. When the list is complete, the picker places the items in queue for delivery by a courier. At the appropriate time, the courier then retrieves the package from the store for delivery. The courier then delivers the goods to the customer's home or work, for example, preferably within the promised time window (e.g., two hours).

DETAILED DESCRIPTION

Examples of the present disclosure relate generally to automated order fulfillment systems, and specifically to systems and methods for parallelizing the request and receipt of customer input for substitutions for an order and the picking process. When fulfilling an order list at a particular store, a picker may find that one or more items on the list are not available. It may then be necessary to obtain the customer's input as to what a suitable substitution may be within a limited amount of time before the order is shipped. The systems and methods described herein can remove the picker from the substitution process to enable the picker to continue down the list, while the system requests and receives the customer's choice(s). The system can then insert the selected substitution back into the picker's list (if the picker is still working on it) or generate a new order for a different picker, which can later be aggregated with the original order.

A problem with conventional substitution systems is that they require the time and attention of the picker. Upon receiving an order from a customer, the order is sent to a picker at the appropriate store (e.g., a local grocery store) to actually pick the items from the store shelves and package them for delivery. As a result, the picker must complete the order with enough time for the courier to deliver the order within the promised time window. So, for example, if the delivery is promised within two hours and the courier requires 30 minutes for delivery, then the picker must complete the order within 90 minutes, or perhaps sooner.

In conventional systems, when an item is out of stock or otherwise unavailable, for example, the picker must stop and send a text message, or similar, to the customer. The message may be anonymized through the system to protect the customer's identity, but nonetheless requires time and attention from the picker. So, for example, the store may be out of stock of a specific type of "peach yogurt." The picker is then forced to stop and send a message to the customer, "Peach yogurt is out of stock, is strawberry yogurt ok?" The picker is then somewhat dependent on the customer to respond. If the customer does not respond at all within a predetermined amount of time (e.g., 85 minutes), then the picker may "short" that item on the list and not send anything.

In some cases, the customer may respond quickly and accept the substitution. This is the best case scenario, however, and still requires the picker to send a message to the customer and wait for a response rather than to continue picking. The next best scenario is that the customer responds quickly and refuses the substitution—i.e., they simply do not want any yogurt if it is not peach. Again, this still requires the picker to send a message to the customer and wait for a response.

The worst case scenario is either that (1) the customer does not respond in a timely manner or (2) the customer suggests their own substitution. As mentioned above, due to tight timelines (e.g., two hours) if the customer does not respond in a timely manner (e.g., within 85 minutes), the picker may be forced to make no substitution and simply leave the item out of the order. If the user suggests a substitution, on the other hand, this can create a time consuming loop.

In other words, if the picker suggests strawberry yogurt and the customer doesn't like strawberry, for example, the customer may respond with, "No, I don't like strawberry, how about kiwi-lime?" The picker is then forced to go back to the yogurt aisle and see if kiwi-lime is available. If it is available, and the customer has responded in a timely manner, then the picker can add the substitution to the order and place it in queue for delivery. If, on the other hand, the substitution suggested by the customer is not available, the picker may then have to send another message, "I'm sorry, kiwi-lime is not available, how about banana?" This creates a potentially time consuming loop that delays the picker and may require multiple responses from the customer.

Figure 1:
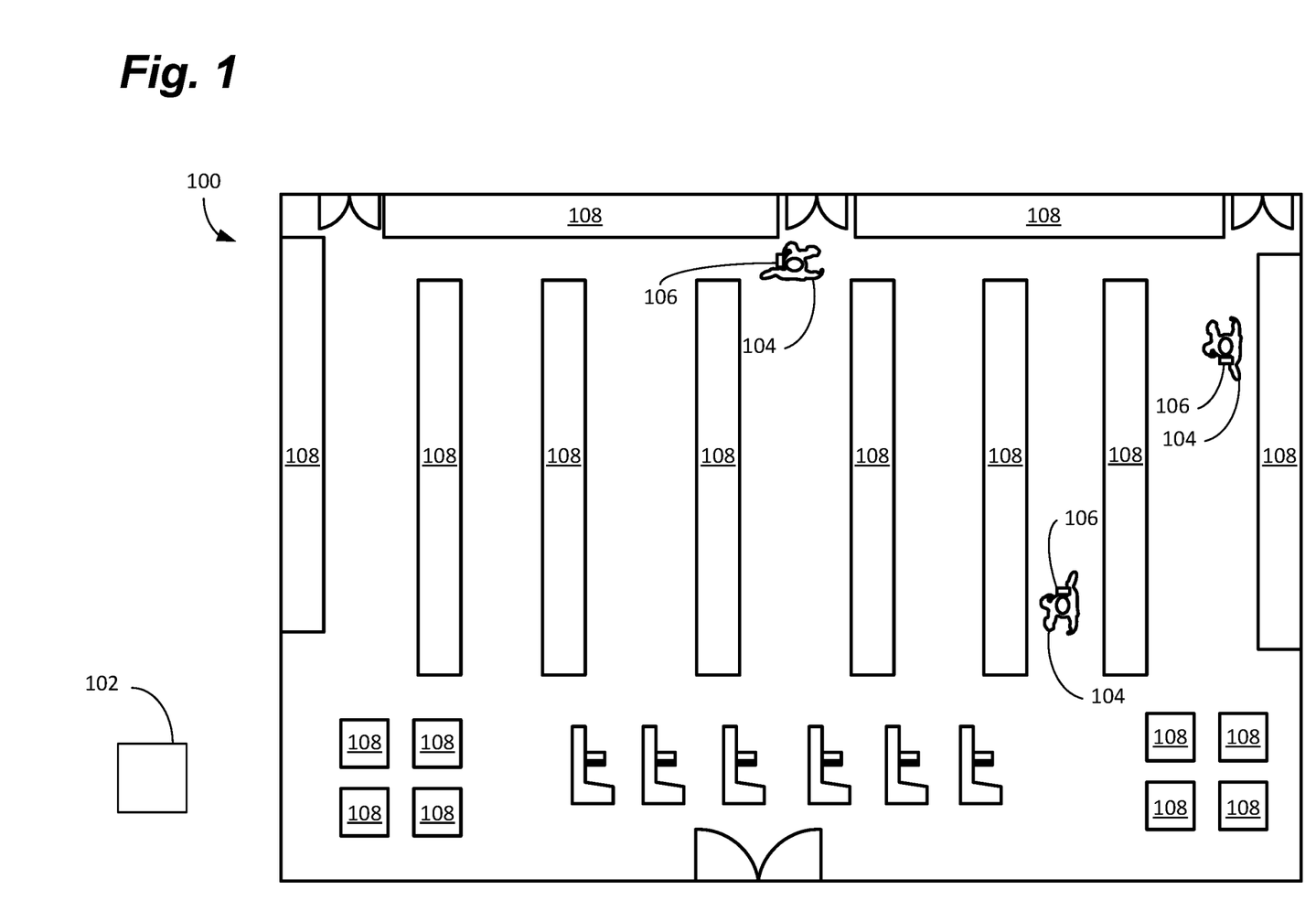
FIG. 1 depicts a store environment including a plurality of pickers and a management module, in accordance with some examples of the present disclosure.

To this end, as shown in FIG. 1, examples of the present disclosure can comprise a system 100 for parallelizing the request for, and receipt of, substitutions to enable the picker to continue picking, while approval is sought separately from the customer. As shown, the system 100 can include a management module 102, for receiving orders from customers. In some examples, the management module 102 can comprise a retail website, kiosk, or other facility for receiving orders directly from customers. In other examples, the management module 102 can comprise a back-end computer that receives orders from a retail or web based consumer outlet, such as a shopping website.

The system 100 can also include a plurality of workers, called "pickers" 104, each with a handheld electronic device 106. The pickers 104 can be workers associated with the store at which the requested merchandise is stocked, can be workers associated with the web service provider who took the order, or can be independent contractors. As mentioned above, the pickers 104 physically walk the store and remove items on the customer's list from the shelves 108 in the store.

In some examples, the handheld electronic device 106 can comprise a device to provide the pickers 104 with the list of requested items and bi-directional communication with the management module 102. This can enable the pickers 104 to indicate when they have located an item on the list and "check it off;" or to indicate that the item is out of stock and requires substitution. If the picker 104 indicates that an item is out of stock and may need substitution, the handheld electronic device 106 can send a message to the management module 102.

Figure 2:
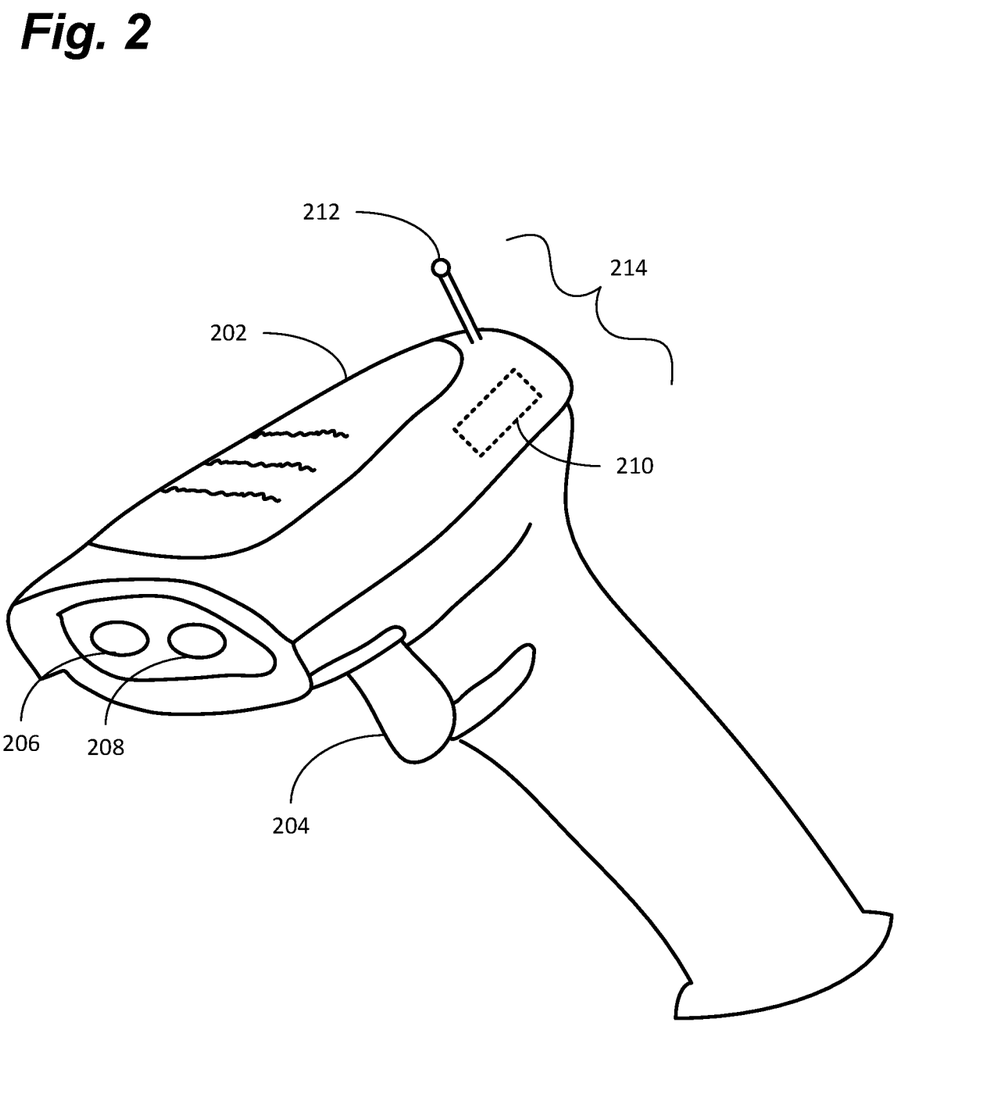
FIG. 2 is an isometric view of a handheld electronic device for use with a substitution system, in accordance with some examples of the present disclosure.

As shown in FIG. 2, the handheld electronic device 106 can comprise a display 202 for displaying the list and other information. The display 202 may provide the picker 104 with a deadline based on the courier pick-up, for example, and may provide the total number of items left to be picked, among other things. The handheld electronic device 106 may also provide one or more inputs to receive information from the picker 104. In some examples, the display 202 can comprise a touchscreen display to receive touch inputs from the picker 104 (e.g., via a finger touch or stylus). In some examples, the handheld electronic device 106 can also include one or more buttons, a keyboard, or other data entry means.

In other examples, the handheld electronic device 106 can comprise a trigger 204. As the picker 104 moves through the list, the trigger 204 can be used to indicate that the next item in the list has been located, or vice-versa (i.e., that a substitution is required). In the former case, the trigger 204 can provide a convenient way to check items off the list as the picker 104 progresses.

In other examples, the handheld electronic device 106 can also include an imaging device 206 and/or a scanner 208. The imaging device 206 can comprise a video or still camera, for example, an infrared camera, or other device to capture the surroundings of the picker 104 to determine location information, among other things. As discussed below, more importantly, the imaging device 206 can be used to capture images of a shelf 108 in the store when a substitution is needed. The imaging device 206 can capture one or more images of a particular shelf 108, bin, rack, or other store container and provide video information to the management module 102 to facilitate the substitution process.

In some examples, the handheld electronic device 106 can also comprise a scanner 208. The scanner 208 can comprise a laser scanner or camera to read and/or interpret a variety of labels including, for example, 2D or 3D bar codes, universal product codes (UPC), pictograms, internal fiducials, or other information from products and/or the shelves 108. In some examples, the scanner 208 can comprise an RFID reader to read passive or active RFID tags on products in the store. In some examples, the scanner 208 can comprise a camera that images the labels to extract relevant information. In some examples, the picker can scan each item as it is retrieved to remove items from the list or check them off the list.

In some examples, the handheld electronic device 106 can comprise a smart phone, tablet, or similar device. In this configuration, the handheld electronic device 106 can utilize the smart phone's existing camera, for example, along with the appropriate software to provide the functionality of the imaging device 206 and/or the scanner 208. Similarly, rather than having a separate display 202 and/or trigger 204, the handheld electronic device 106 may use the smart phone's touchscreen or keyboard for these functions. In this manner, a dedicated handheld electronic device 106 is not required, though one may be preferred for customization or security purposes, for example.

In other examples, the picker can scan the bar code on the shelf for an item that needs to be substituted. So, for example, if the picker reaches an item on the list that is not in stock, the picker can scan the bar code for the missing items and send a substitution message to the management module 102. The management module 102 can then begin the substitution process by contacting the customer, while the picker continues to retrieve the remaining items on the list. In this manner, the picker can continue picking while, in parallel, the management module 102 (or other component of the system) is handling the substitution. Thus, the time required by the picker to affect a substitution is reduced and productivity is improved.

In some examples, the handheld electronic device 106 can also comprise a transceiver 210 and an antenna 212 (collectively, the communications system 214) to provide wireless communication between the handheld electronic device 106 and the management module 102, website, or store. The communications system 214 can enable the handheld electronic device 106 to receive orders, substitutions, and other information from the management module 102. The communications system 214 can also enable the handheld electronic device 106 to send information to the management module 102 including, for example, the picker's progress on the list, the picker's location, and the amount of time that the picker 104 has been working on the current list.

In some examples, the handheld electronic device 106 can also use the transceiver 210 to provide location services. The transceiver 210 can utilize cellular location services, for example, or GPS to provide location information for the picker during the picking process. In some examples, location services can be used to provide the picker's location in the store, which can be coupled with the items being retrieved on the list to compile a map of the store. In other words, if the picker checks one or more items off the pick list and his location is known, then the items can be assumed to be in that approximate location. This information can be aggregated over time to compile a map of each store for which a website provider, for example, provides shopping services. In this manner, though the website provider may never go to the actual stores, they can nonetheless compile maps of each store. This information can, in turn, be used to create efficiently ordered lists to minimize the distance traveled by the pickers, among other things.

The communications system 214, coupled with the imaging device 206 and/or scanner 208 can send information to the management module 102 regarding items that are out of stock and possible substitutions. As discussed below, when a particular item is out of stock, for example, the handheld electronic device 106 can be used to identify the item on the list (e.g., by pulling the trigger, pressing a button, or touching the appropriate portion of the display 202) and send a message to the management module 102 to that effect. In some examples, the handheld electronic device 106 may be used to capture one or more images of the shelf 108 on which the item is normally stocked. In some examples, the imaging device 206 and/or the scanner 208 can also be used to capture one or more bar codes on the products and/or the shelf 108. This can enable the management module 102 and/or the customer to determine what products are in stock and make an efficient substitution.

So, for example, if a particular item is out of stock, the picker can scan the bar code on the shelf for that item and indicate, via the handheld electronic device 106, that the item is out of stock. The picker can then scan bar codes for products proximate the out of stock item and indicate these items as possible substitutions. In some examples, the picker can take a picture of the shelf proximate the out of stock item to show which products are still in stock. The picker can then send a message to the management module 102 with this information and await a response.

In the meantime, the picker can continue picking and the management module 102 can send an appropriate message to the customer to choose a substitution. This can enable the picker to continue working, while the management module 102 handles receiving the substitution request from the customer. As discussed below, the customer can be provided with a variety of ways to indicate their selection from a list, an image, or other means.

Once received, if the picker is still working on the list, the management module 102 can send a message back to the handheld electronic device 106 with the customer's substitution. In some examples, the substitution can merely be appended to the end of the picker's list. In other examples, the substitution can be "intelligently" inserted into the picker's remaining list. In other words, if one or more items on the picker's list is located proximate the substitution, then the substitution can be inserted into the picker's list before or after this item. In other examples, the substitution can be added to the picker's list based on the picker's personal habit or preferences (e.g., they always pick produce last).

Figure 3A:
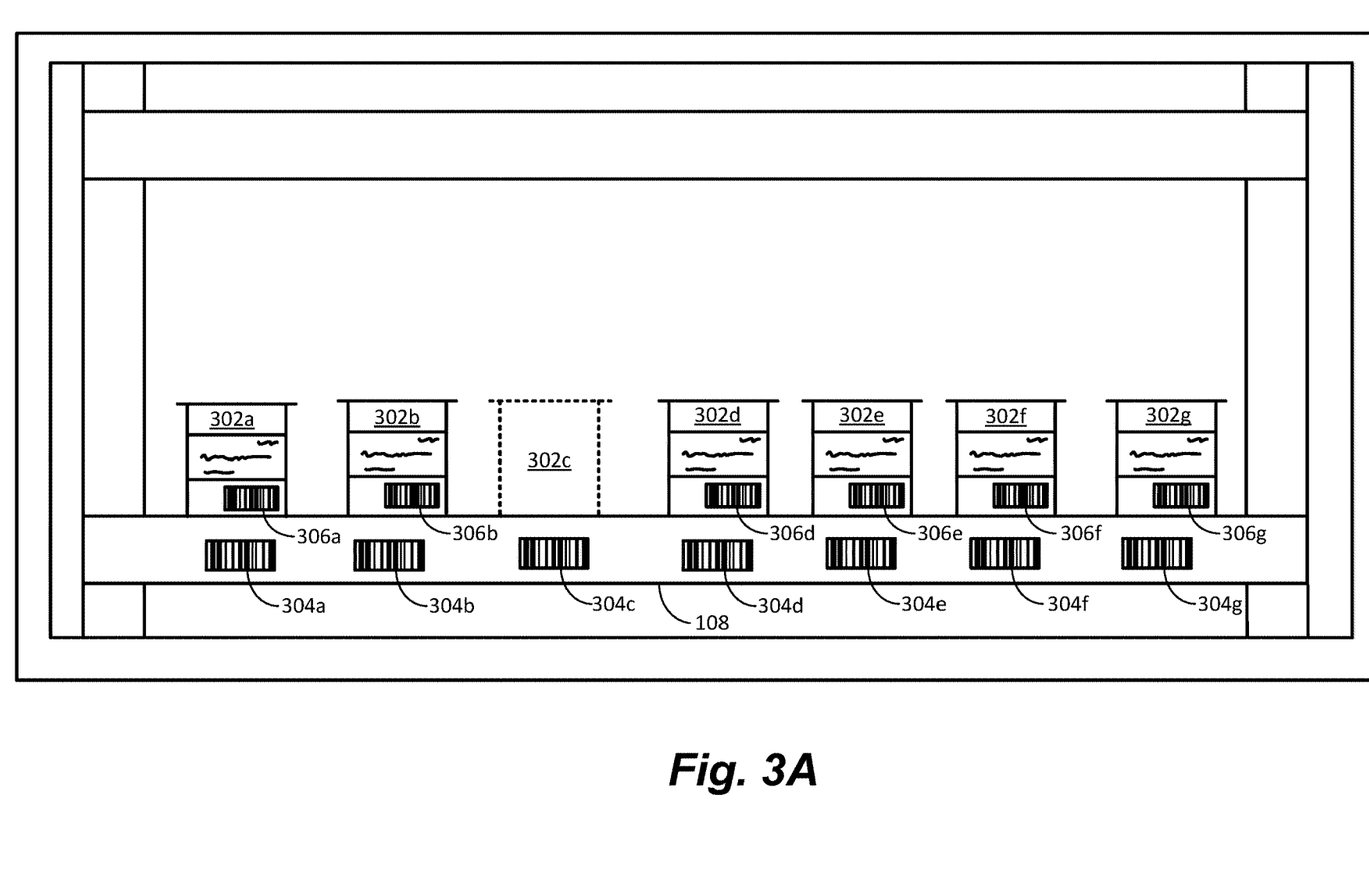
FIG. 3A is a front view of a store shelf with a plurality of products with bar codes and one missing product, in accordance with some examples of the present disclosure.

As shown in FIG. 3A, in some examples, the handheld electronic device 106 can capture one or more images 300 of the shelf 108 on which the item is normally stocked, but is currently out of stock. So, for example, if the customer requested yogurt 302c, which is currently out of stock, the picker 104 can take an image of the shelf proximate the out of stock item 302c with the imaging device 206 and send it to the management module 102 with the communications system 214. The image can include the other yogurts 302a, 302b, 302d, 302e, etc. that are available and thus, represent possible substitutions.

In some examples, the out-of-stock product and/or the substitute product may be located in more than one location or may occupy more than one shelf 108. In this instance, the imaging device 206 can be used to take a video of the surrounding area, for example, or to take multiple images of the surrounding area. In some examples, multiple images can be taken of multiple shelves 108, for example, or an entire freezer case. In some examples, the multiple images can then be "stitched" back together using image processing tools to form a single large, image of the larger area. In some examples, the picker 104 can take a video of the applicable area that can then be processed into multiple images, a composite image, or a slide show, for example, to provide the customer with multiple substitution options.

At the management module 102, the picture can undergo a variety of processing. In some examples, the management module 102 can attempt to read one or more shelf bar codes 304 provided by the store on the shelf 108 to determine what products are still in stock. In other examples, the management module 102 can attempt to read one or more product bar codes 306 on the product packaging to determine what products are still in stock. In some examples, the management module 102 may compare the shelf bar codes 304 from the shelf 108 to the product bar codes 306 on the products to determine what products are out of stock. In other words, if the management module 102 detects seven shelf bar codes 304 on the shelf, but only six product bar codes 306 on the products, then the bar code that appears on the shelf 108, but not on the product 306 is the missing, or out of stock item. In some examples, the management module 102 may also compare the shelf bar codes 304 to ensure that the products are stocked in the correct location.

Based on the shelf bar codes 304, the management module 102 can consult an inventory list, database, or other reference to determine what products are in stock. The management module 102 can then send a message to the customer stating, for example, "The peach yogurt you requested is out of stock. We can offer you the following substitutions:". The management module 102 can then provide a numbered list, for example, and request a text back from the customer with the number of the substitution they wish to make or a zero to simply remove the item from the list. Other user input is also possible.

In other examples, the management module 102 can use text recognition software to attempt to extract the brand, product type, flavor, size, and other information from the product packaging. This can be used instead of, or in concert with, the bar codes 304, 306 on the packaging and/or shelf 108. In some examples, this information can be extracted to provide the customer with a "natural English" list, listing the brand, product, flavor, size, and other information as it would generally appear on a shopping website, for example.

Figure 3B:
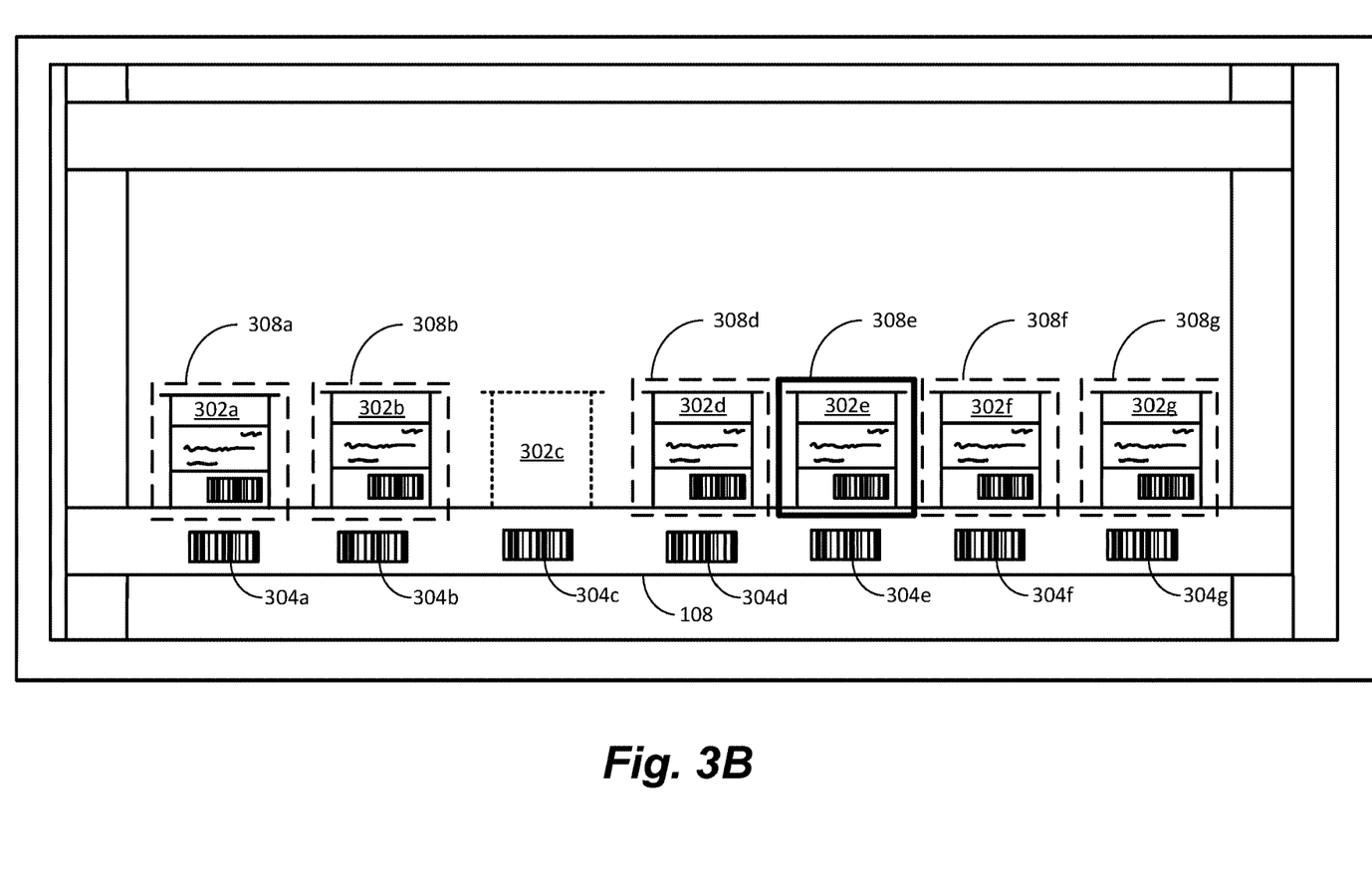
FIG. 3B is a front view of a store shelf with a plurality of products with bar codes to which selection boxes have been added to the available products, in accordance with some examples of the present disclosure.

As shown in FIG. 3B, in other examples, the management module 102 can use image processing software to apply additional processing to the picture from the handheld electronic device 106. The management module 102 can apply selection boxes 308, or other indicia, to the picture, for example, which can provide a box around the product, an approximate outline to the packaging for the product, or other indicia to enable the customer to graphically select a substitution. Each selection box 308 can then be associated with the product over which it appears. In this manner, the management module 102 can send the picture with designated areas for the customer to touch to make a choice for the substitution.

Thus, if the customer selects selection box 308e, as shown, the selection box 308e can highlight, turn solid, change colors, or otherwise indicate that the customer has chosen product 302e. In some examples, the management module 102 can simply receive a screen coordinate from an application on the user's cell phone or tablet. Again, if the customer wishes to simply remove the item from the list, the picture can include a "never mind" button, or similar, or the customer can simply text back a zero or "no."

Figure 3C:
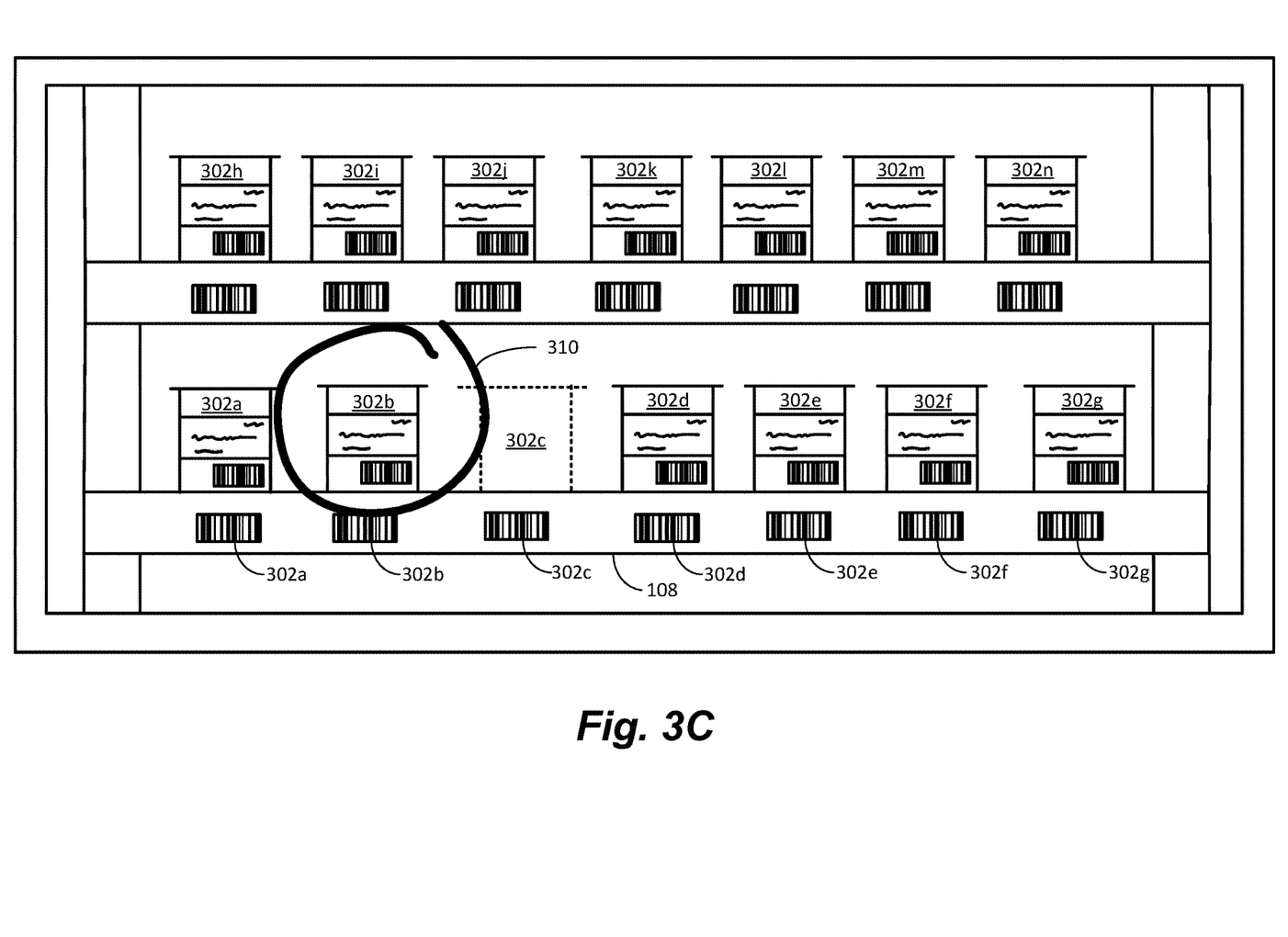
FIG. 3C is a front view of two store shelves with a plurality of products with bar codes on which a customer has made a manual substitution selection by selecting the appropriate substitution product, in accordance with some examples of the present disclosure.

As shown in FIG. 3C, in some examples, the management module 102 can send the image to the customer and simply ask that the customer provide an indicator 310 to indicate which product they would like to substitute. So, for example, as shown, the customer can provide an indicator 310 by simply touching a location on the displayed image via a touch screen display to create a touch marker or pin, draw a circle, box, "X" over the product they wish to substitute, or take other selection actions. In some examples, the management module 102 may simply send a modified version of the image (e.g., including a touch marker or other mark) back to the handheld electronic device 106 for the picker 104 to decipher. Assuming that the customer has been fairly clear with their selection, the picker 104 can easily determine which product the customer would like to substitute.

If, on the other hand, it is unclear what the customer has selected (e.g., they have drawn too big a circle that covers more than one product), the picker 104 may resend the image to the management module 102 to be resent to the customer. In other examples, the picker 104 can take an additional image, perhaps at a greater zoom, such that only the two products in question, for example, are in the image. The image can then be resent to the management module 102 and customer to clarify their selection.

In other examples, the management module 102 can perform additional image processing to automatically determine which product the customer has selected. So, for example, the management module 102 can determine which bar code(s) 304, 306 are located within the customer's selection, for example. The management module 102 can then look up one, or both, barcodes 304, 306 in an inventory list to determine which product the customer has selected. The management module 102 can then send the selection to the picker 104 for substitution.

As discussed above, and shown in FIG. 3C, in some examples, the products 302a-302n may occupy multiple shelves. In this case, it may be desirable to send an image of multiple shelves 108, as shown, or to send multiple images. In some examples, there may be some substitute products (e.g., yogurts 302a-302n) on the same shelf 108, or in the same area, with the requested product (e.g., yogurt 302c), but other possible substitutes in another area of the store (e.g., sandwich meat may be available on the refrigerated aisle and in the deli). In this case, the picker 104 can provide multiple images to cover multiple locations.

Figure 4:
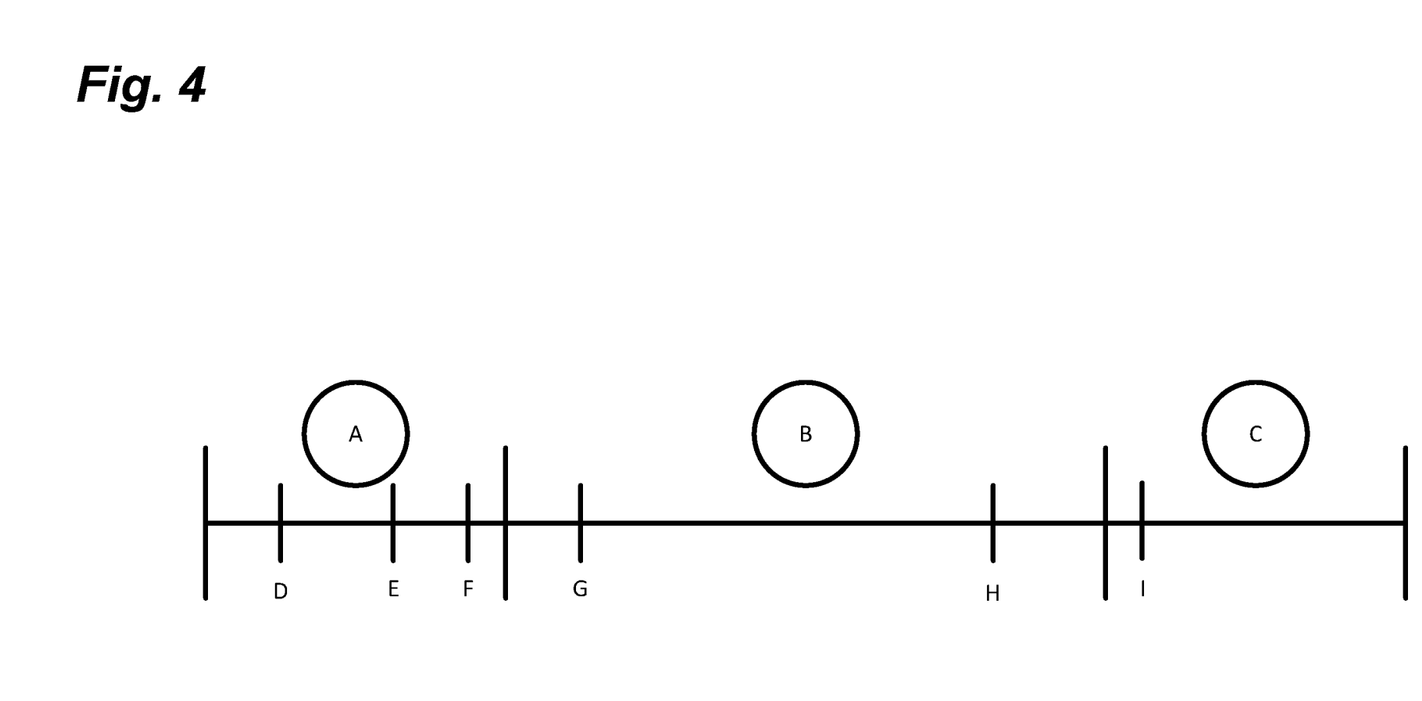
FIG. 4 depicts a picking and delivery timeline, in accordance with some examples of the present disclosure.

As shown in FIG. 4, the system can make substitutions in different ways depending on when the substitution is discovered and when the customer responds. In this case, if the delivery is guaranteed for two hours, the courier will have some timeframe within which the order must be provided by the seller, "C." The courier may require the last 30 minutes, for example, in a two hour delivery window. At the other end of the timeline, "A," the seller must receive the order, a picker 104 must be available (i.e., they may all be busy), and the picker 104 must complete the pick. Assuming that a picker 104 is available immediately, however, picking the actual products may also take 30 minutes.

Thus, if a substitution is discovered early in the picking process, "D," by Picker 1 and the customer responds quickly, "E," the substitution can be appended to the Picker 1's list. In some examples, the substitution can be placed at the end of Picker 1's list. In other examples, the substitution can be inserted in Picker 1's list based on the items remaining on the list. If, for example, the list includes items that are close to the substitution, or in the same department, the substitution can be intelligently appended to the list before or after those items.

In some examples, regardless of whether Picker 1 is still picking the list, the substitution may nonetheless be appended to Picker 2's list. This may be because Picker 2 is near the substitution, for example, or will be when working on their pick list. This may be because Picker 1 is near the end of their list, for example, and is on the opposite side of the store. Picker 2 can receive the substitution, place it in a separate bag or compartment, for example, and then complete the rest of their pick list. When complete, Picker 2 can add the substitution to the order from Picker 1 to complete the order.

If, on the other hand, the substitution is discovered late in the picking process, "F," then the substitution can be added to a new order and provided back to Picker 1 or to Picker 2. In some examples, the substitution can be added to Picker 2's list for them to pick and package separately from their current order. Picker 2 can be chosen based on their current location, for example, or based on the items remaining on their list. In other examples, if Picker 1 is still unoccupied (e.g., the customer responds soon after Picker 1 finishes), then the substitution can go to Picker 1 as a new order. In either case, the substitution can be aggregated with the original order from Picker 1 prior to delivery.

In some examples, to avoid a sense of urgency, the original request to the customer may not include a deadline. If the customer responds in a timely manner, then a deadline is obviated. If, on the other hand, the customer has not responded within a predetermined amount of time (e.g., 15 minutes from the courier cutoff, C), the management module 102 may send a reminder H to the customer including a deadline. If the customer does not respond within a predetermined amount of time (e.g., within 5 minutes of the courier cutoff, C), then the system can simply drop the item from the order to maintain the two-hour deadline.

In other examples, the substitution may be found late in the picking process, F, and the customer may fail to respond in a timely manner, I, despite receiving the initial substitution request, F, and a reminder, H. In this case, the substitution can be dropped from the order and the order can be provided to the courier for delivery.

In some examples, customers can choose when ordering whether order completion or timeliness is paramount. In other words, some customers may prefer to have their order delivered within the two-hour window even if the order is not complete (e.g., because they were unable to respond to a substitution request in a timely manner). Other customers may not have a time requirement and thus, would prefer that the order be complete prior to delivery despite delays. This choice can be factored into the timeline when substitutions are required.

In still other examples, at G, the substitution may be received after the first picker has completed the first pick list, B, but with enough time to add the substitution to a new order, prior to the delivery window, C. In this case, the substitution can be added to a new order and provided back to Picker 1 or to Picker 2. In some examples, the substitution can be added to Picker 2's list for them to pick and package separately from their current order. Picker 2 can be chosen based on their current location, for example, or based on the items remaining on their list. In other examples, if Picker 1 is still unoccupied (e.g., the customer responds soon after Picker 1 finishes), then the substitution can go to Picker 1 as a new order. In either case, the substitution can be aggregated with the original order from Picker 1 prior to delivery.

Figure 5A:
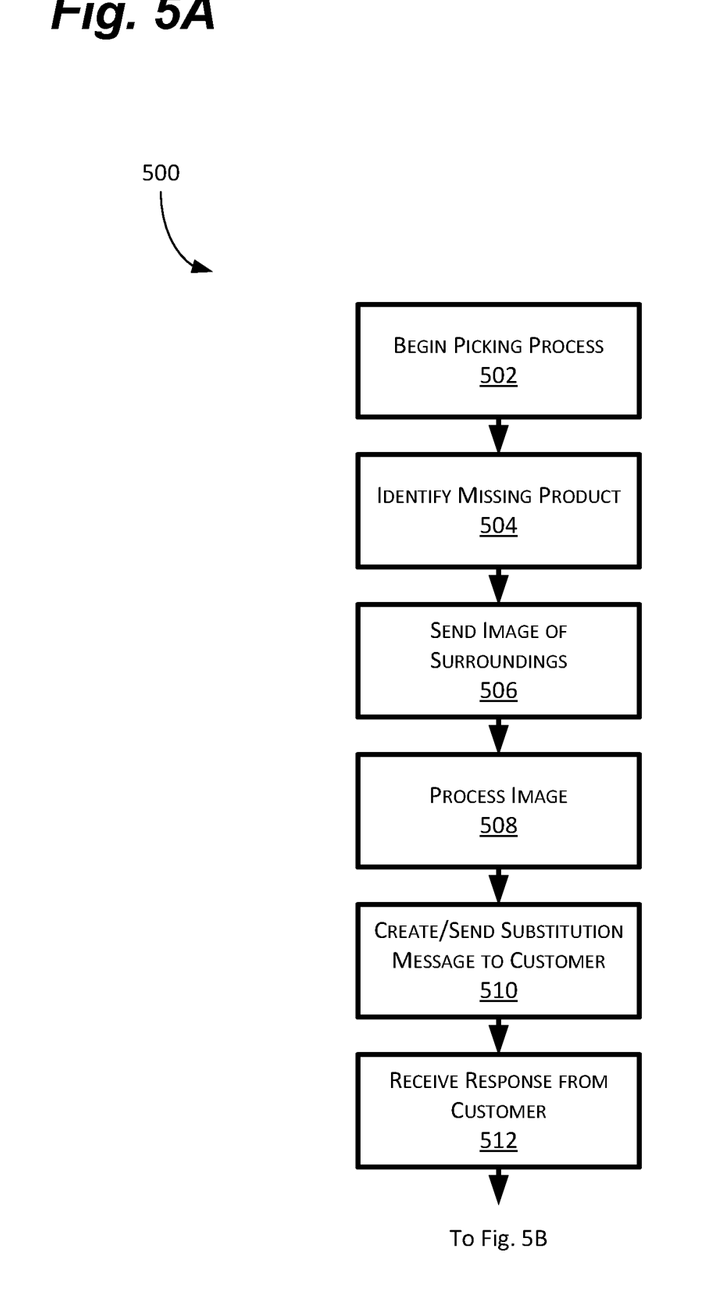
FIGS. 5A and 5B are flowcharts that depict the picking and substitution process, in accordance with some examples of the present disclosure.
Figure 5B:
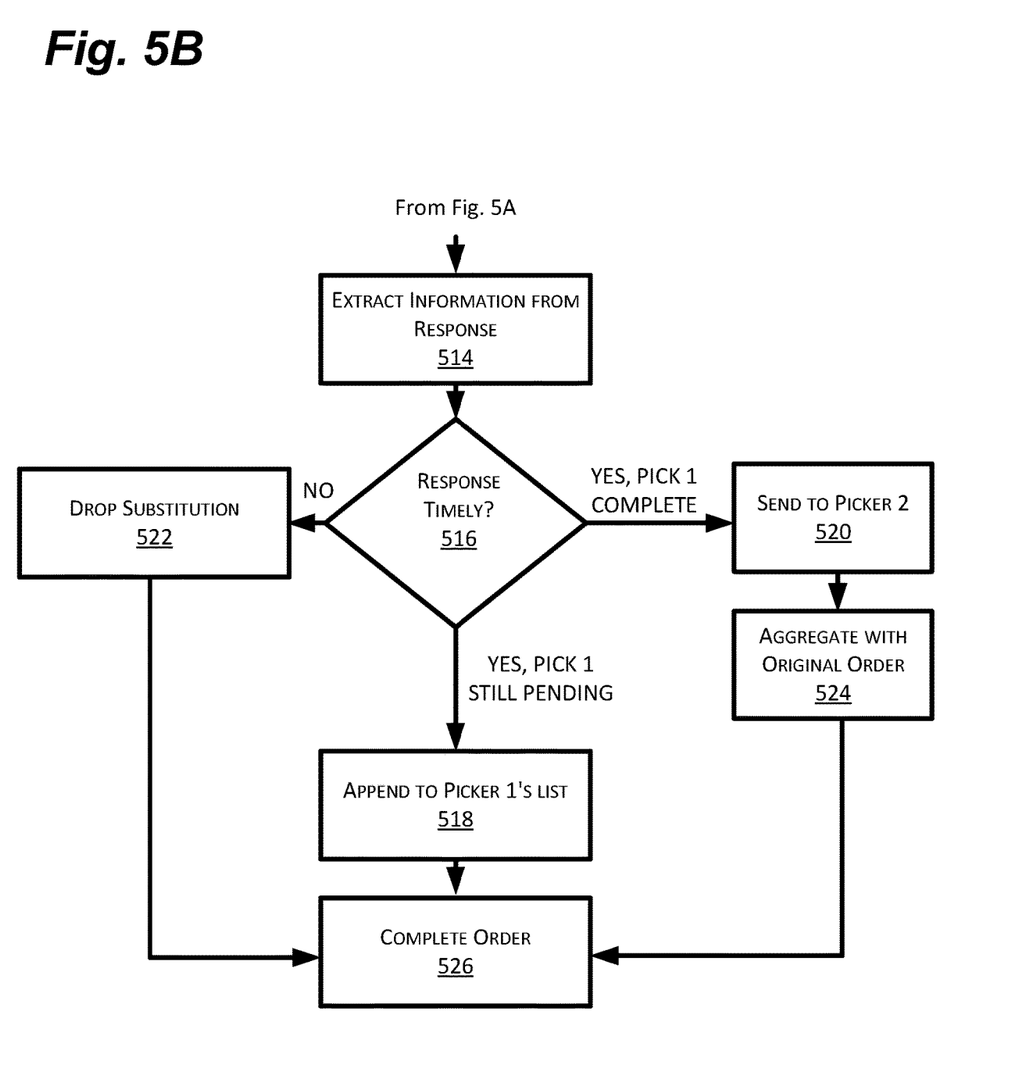

As shown in FIGS. 5A and 5B, examples of the present disclosure can also comprise a method 500 for making substitutions during the picking process. At 502, the picker 104 can begin the picking process for an order. At 504, the picker 104 can discover that a requested item in the order is not available and provide an indication on the handheld electronic device 106 to that effect. This can include pulling the trigger 204, pressing a button, or providing an input via the touchscreen 202, among other things, to send a substitution request to the management module 102. In some examples, the picker 104 can provide a list of possible substitutions that are in stock. Alternatively or additionally, at 506, in some examples, the picker 104 can also take an image of the shelf, bin, freezer, cooler, or other area(s) immediately surrounding the missing item to provide an overview of possible substitutions. In some examples, as discussed above, the picker 104 can take multiple images in multiple locations associated with possible substitute items (e.g., bread may be located on the bread aisle and in the bakery).

At 508, the management module 102 can perform any necessary post-processing on the image. The management module 102 may extract bar codes 304, 306 from the image, for example, to determine what substitutions are available. In some examples, based on this information, the management module 102 may create a list of possible substitutions. In some examples, the management module 102 may add selection boxes 308 to the image to enable the customer to select a substitution. At 510, the management module 102 can create and send a substitution message to the customer requesting a response. In some examples, the substitution message can include an explanation, such as "The item you requested is not available. Would you like to substitute any of the following items?" This can be followed by a numbered list of substitutions, for example, or the aforementioned image with or without selection boxes 308. In some examples, the message can also include a "No thank you" or "Refuse" button if the customer does not wish to make any substitution.

At 512, the management module 102 can receive a response from the customer. This can include a number from the number list, for example, an activated selection box 308, or a circle, box, or X drawn on the image by the customer. In some examples, if the customer does not wish to make a substitution, the customer can respond with the appropriate message (e.g., "no" or "0") or press the refuse button.

At 514, if the customer made a substitution selection, the management module 102 can extract the customer's selection from the response. As mentioned above, this can include extracting label information, bar codes 304, 306 data, or other information from the image. In some examples, the selection of a selection box 308 can be linked to a respective product for substitution. In some examples, the customer may have simply texted a number associated with the number list sent by the management module 102. In some examples, such as when the customer merely circled their substitution, the management module 102 may either identify the selected substitution, or simply send the image to the picker 104 for interpretation.

At 516, the management module 102 can determine if the substitution was received in a timely manner. At 518, if the substitution was discovered early in the picking process and the customer was quick with their response, the original picker (Picker 1) may still be in the picking process. If so, the substitution can be appended to Picker 1's list to complete the order. As mentioned above, in some examples, the substitution can simply be added to the end of Picker 1's list. In other examples, the substitution can be intelligently added to Picker 1's list—e.g., it can be added to the list near other products in the same area.

At 520, if the substitution was received after Picker 1 has completed the remainder of the list, the substitution can be sent to Picker 2. In some examples, a new order can be generated containing only the substitution and Picker 2 can pick the substitution to be aggregated with the remaining order. In other examples, Picker 2 may be in the process of picking a separate order, and the substitution can be added to Picker 2's list as a separate order. In some examples, Picker 2 can be selected based on their current location in the store, the remaining items on their list, or other factors to improve efficiency. Picker 2 may be instructed, for example, to place the substitution in a separate bag or bin to avoid confusion.

At 524, if Picker 2 was provided with only the substitution to pick, then when Picker 2 returns with the substitution, it can be aggregated with the rest of the order provided by Picker 1. Similarly, if the substitution was appended to Picker 2's current pick list, then when Picker 2 completes both their current pick list and retrieves the substitution, the substitution can be aggregated with the rest of the order.

Regardless of who receives the substitution (i.e., Picker 1 or Picker 2), the management module 102 can send the substitution response to the appropriate picker 104. In some examples, the substitution response can comprise the name or UPC, for example, of the actual product (e.g., if the management module 102 was able to extract the information from the customer's response). In other examples, the management module 102 can simply send the image, for example, to the picker 104 for the picker 104 to decipher. If the image contains a selection box 308 activated by the customer, for example, the picker 104 can easily determine which product the customer has selected. Similarly, if the customer has drawn a circle or box around the substitution (assuming it is sufficiently clear), the picker 104 can easily identify the substitution.

At 522, if the substitution request was not received in a timely manner, then the management module 102 can simply drop that item from the order. This may be because there is insufficient time to pick the item before the courier leaves, or because the courier has already left. In some examples, the management module 102 can send a message to the customer informing the customer that the substitution was not received in time, and that the order has been fulfilled without a substitution. In some examples, the substitution may be dropped at 522 (even if the response from the customer was timely) because the customer has indicated that they do not wish to make a substitution—e.g., they have selected the "no thank you," or "cancel" button.

At 526, the management module 102 can complete the order, with or without the substitution. If the substitution was received by Picker 1, for example, then the order can be completed and provided to the courier for delivery. If the substitution was received by Picker 2, on the other hand, then the order can be aggregated to include the original pick list and the substitution and provided to the courier as a single delivery. If the substitution request was not received in time or rejected by the customer, the order is completed without a substitution and provided to the courier for delivery.

Figure 6:
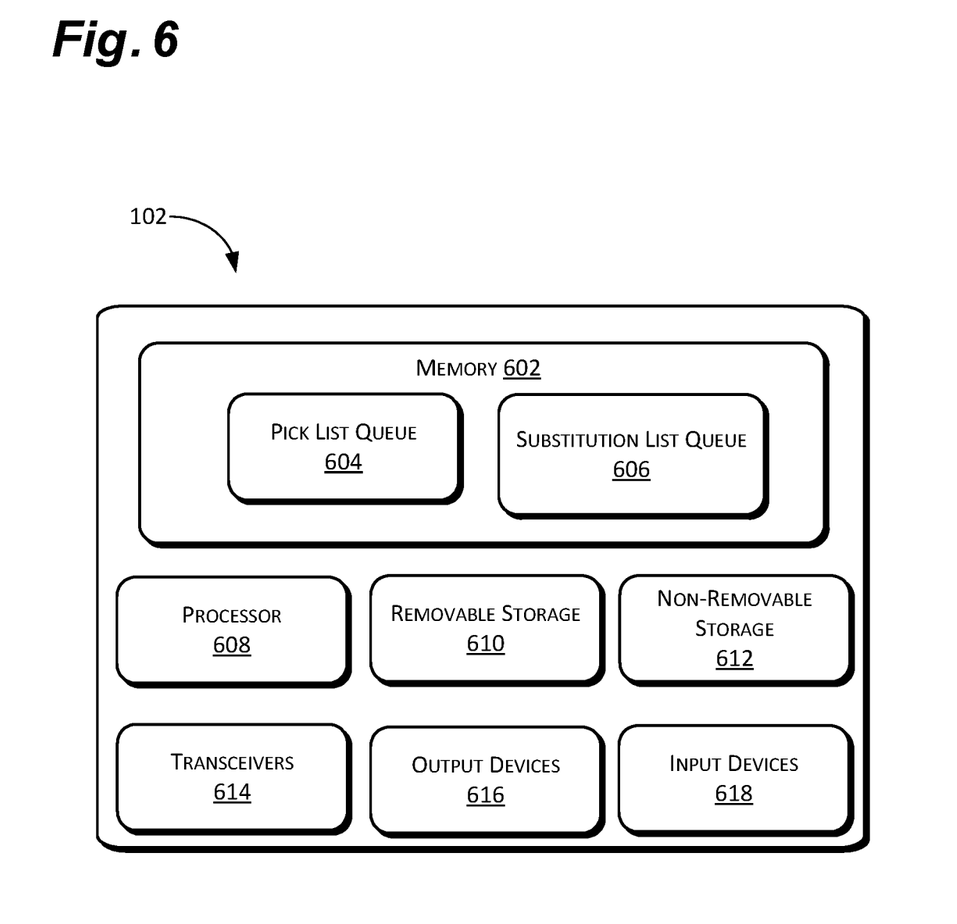
FIG. 6 depicts a component level view of an exemplary management module, in accordance with some examples of the present disclosure.

FIG. 6 illustrates a component level view of the management module 102 or computer. As discussed below, the management module 102 is configured to receive and manage pick lists, picker assignments, and/or substitutions. As illustrated, the management module 102 comprises a system memory 602 storing at least a pick list queue 604 and a substitution queue 606. Also, the management module 102 includes processor(s) 608, a removable storage 610, a non-removable storage 612, transceivers 614, output device(s) 616, and input device(s) 618. The management module 102 may additionally contain a policy engine to receive, create, transmit, and manage pick lists and/or substitutions.

In various implementations, system memory 602 is volatile (such as RAM), nonvolatile (such as ROM, flash memory, etc.), or some combination of the two. The pick list queue 604 may include a list of pick lists awaiting picking, records for customers of the shopping outlet (e.g., a customer of the website from which the order was received), information related to service providers and stores, among other things. The records may also include information related to order volume and size from various service providers, average wait times, delivery times, and other information related to ensuring that the desired delivery window (e.g., one hour, two hours, four hours, etc.) can be met. In some examples, the pick list queue 604 can have a maximum number of lists in queue, or maximum total number of items to be picked, for example, to ensure timely delivery.

The substitution queue 606 can receive substitutions from pickers and manage the handling of substitutions between the system and the customer. In some examples, the substitution queue 606 can maintain the total number of substitutions in process at a given time, the substitutions themselves, the time when the order was received, and the time when the substitution request was received. The substitution queue 606 can also receive images and messages from the pickers, and can communicate with the customers to receive substitution requests. The substitution queue 606 can also drop substitution requests when the customer does not respond in a timely manner, or when the customer responds that they do not wish to make a substitution.

In some examples, the substitution queue 606 can use machine learning, or other means, to improve on and/or automate the substitution process. In other words, the substitution queue 606 can track the items that often require substitution, what substitutions are most recommended by pickers, and what substitutions are most often accepted by customers. In this manner, the substitution queue 606 can improve the efficiency of the picking and substitution processes.

The efficiency of the picking process can be improved, for example, by placing those items with a high substitution rate at the beginning of the picker's pick list. Items with high substitution rates may be those items that have low levels of stock in the first place (i.e., the store only stocks one or two units of the item), for example, items that have many flavors (e.g., yogurt) for which only a few of each flavor are stocked, or items that are large or bulky and can only be stocked in small numbers. By placing the highly substituted items at the top of the pick list, substitutions can be discovered early in the picking process. This, in turn, can enable substitution requests to be made to the customer early in the process, improving the chances that the substitution request can be fulfilled within the time constraints of delivery.

The efficiency of the substitution process, on the other hand, can also be improved by tracking those substitutions that are most often accepted by customers. Thus, if a particular flavor of ice cream is rarely accepted as a substitute (e.g., less than 50% of the time), then the substitution queue 606 can simply remove that flavor as a choice. In other examples, if a particular kind of ground beef is almost always accepted as a substitution for another kind of ground beef (e.g., 95% of the time), then that substitution can be placed at the top of the list of substitutions in the substitution request.

If a particular substitution is basically always accepted (e.g., more than 99% of the time), the substitution queue 606 may make the substitution proactively and merely inform the customer of the substitution. In this manner, the system is not required to wait for a response from the customer. In some cases, the substitution queue 606 can send a "negative" substitution request to the customer. In other words, in the case of a substitution that is almost always accepted by customers, the substitution queue 606 can send a message, "The product you requested was out of stock, we have made the following substitution. If you do NOT wish to make this substitution, please reply to this message with 'No.'"

In some implementations, the processor(s) 608 can comprise a central processing unit (CPU), a graphics processing unit (GPU), or both a CPU and a GPU, or any other sort of processing unit. The CPU can be responsible for the machine learning process discussed above and can run one or more algorithms based on the substitution history for a particular product, store, or picker, among other things. The GPU can be responsible for receiving and sending images from the picker in the substitution process and for the above-mentioned image processing. The GPU can process and add the aforementioned selection boxes 308, for example, to enable the customer to make a graphics based selection for the substitution.

The management module 102 may also include additional data storage devices (removable and/or non-removable) such as, for example, magnetic disks, optical disks, or tape. Such additional storage is illustrated in FIG. 6 by removable storage 610 and non-removable storage 612. The removable storage 610 and non-removable storage 612 can store the various programs and algorithms for the substitution process and can include a substitution database, including the history of substitutions, the success rate for each substitution, or type of substitution, related pick list items, and other information useful for the machine learning process.

Non-transitory computer-readable media may include volatile and nonvolatile, removable and non-removable tangible, physical media implemented in technology for storage of information, such as computer readable instructions, data structures, program modules, or other data. System memory 602, removable storage 610, and non-removable storage 612 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the management module 102. Any such non-transitory computer-readable media may be part of the management module 102 or may be a separate database or databank.

In some implementations, the transceivers 614 include any sort of transceivers known in the art. For example, the transceivers 614 may include wired communication components, such as an Ethernet port, for communicating with other networked devices. Also or instead, the transceivers 614 may include wireless modem(s) to facilitate wireless connectivity with other computing devices and with the handheld electronic device 106. Further, the transceivers 614 may include a radio transceiver that performs the function of transmitting and receiving radio frequency communications via an antenna (e.g., WiFi or Bluetooth®).

In some examples, the management module 102 can be located at the store for which the pick list applies and can be part of a store wired and/or wireless network. In other examples, the management module 102 can be remote to the store and can be located at, for example, the website service provider, remote server bank, or other remote location. The management module 102 may be in communication with the store network via the internet, a private network, or virtual private network (VPN). In other examples, the management module 102 and the handheld electronic devices 106 can comprise a standalone network and can be connected by Wi-Fi or cellular network connection to operate substantially autonomously from the store network.

In some implementations, the output devices 616 include any sort of output devices known in the art, such as a display (e.g., a liquid crystal display), a touchscreen display, speakers, a vibrating mechanism, or a tactile feedback mechanism. Output devices 616 also include ports for one or more peripheral devices, such as headphones, peripheral speakers, or a peripheral display.

In various implementations, input devices 618 include any sort of input devices known in the art. For example, input devices 618 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), a touchscreen, or one or more other types of keys or buttons, and may also include a joystick, wheel, and/or designated navigation buttons, or the like.

The output devices 616 and/or input devices 618 can enable a worker at the service provider to intervene, when necessary, in the substitution process. If, for example, a substitution has not been previously requested, a worker at the service provider, in concert with the picker, may formulate a reasonable substitution request for the item. In some examples, items may be so readily available as to almost never require substitution. In this case, the machine learning algorithm may simply not have enough information to determine a substitution strategy. In this case, the worker at the service provider and/or the picker can formulate a substitution request to the customer.

Figure 7:
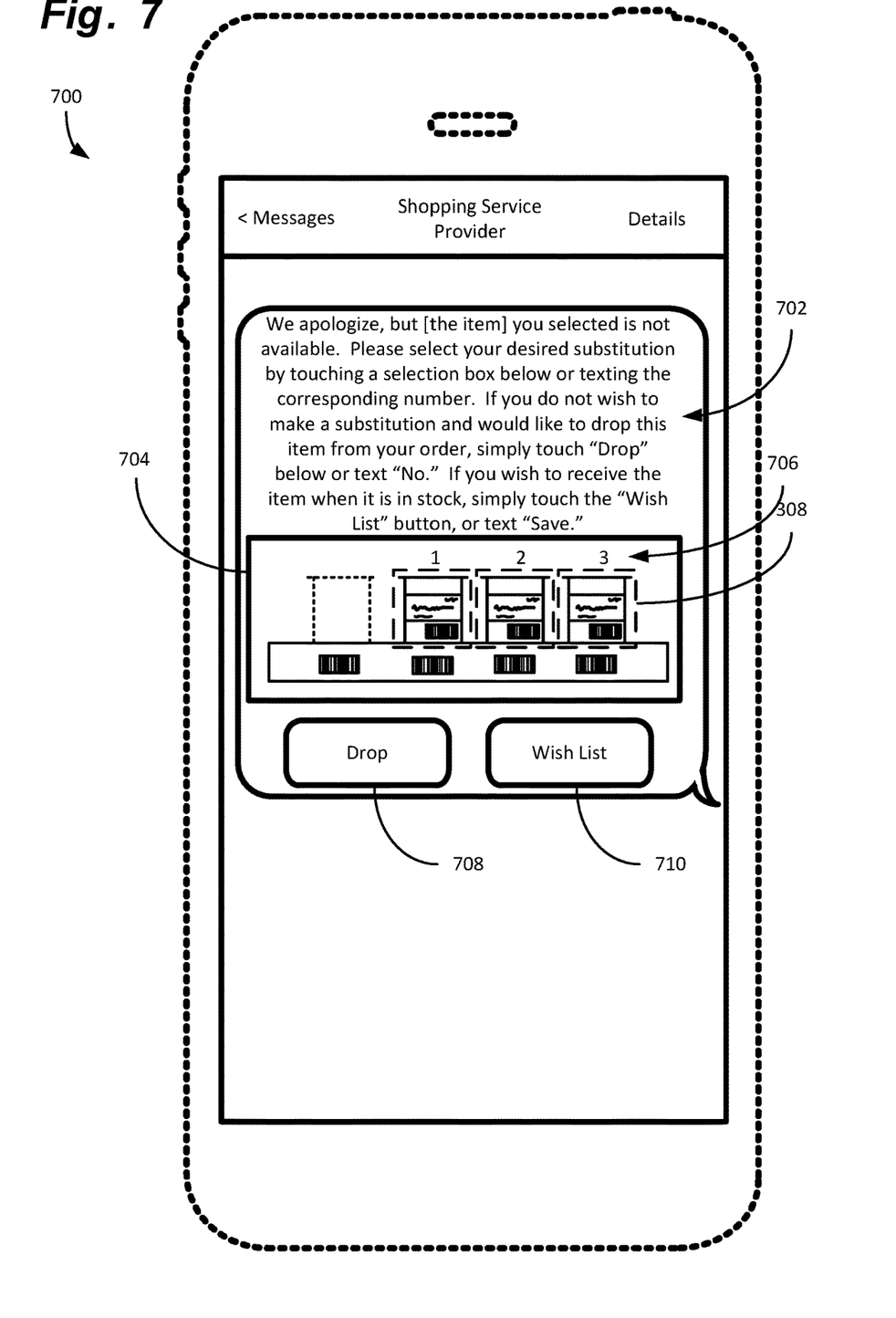
FIG. 7 depicts an example graphical user interface (GUI) for use with the substitution process, in accordance with some examples of the present disclosure.

As shown in FIG. 7, examples of the present disclosure can also comprise a graphical user interface (GUI) 700 for display on the customer's electronic device to facilitate the substitution process. The customer's electronic device can comprise, for example, a cell phone, tablet, laptop or desktop computer, or other internet or cellular connected device. In some examples, the GUI 700 can comprise an introductory message 702 to inform the customer that a substitution is required. The introductory message 702 can include the name of the item that is not available and provide instruction to the customer about how to affect the desired substitution.

In some examples, as discussed above, the GUI 700 can include an image 704 of possible substitutions. The image 704 can include products located proximate the item that is out of stock, shelves located in the same area, or even the contents of a bin or other storage container (e.g., a freezer or meat counter). In some examples, for customers with touchscreens, for example, the image 704 can also contain the aforementioned selection boxes 308. The selection boxes 308 can correspond to various products that can be substituted for the missing item. For customers without touchscreens, the image 704 can also contain one or more identifiers 706 to enable the customer to respond textually to the request. The identifiers 706 can be numbers or letters, for example, to enable the customer to select the desired substitution. In some examples, the customer can simply text the appropriate number back to indicate their selection.

In some examples, the GUI 700 can also include a refusal button 708. The refusal button 708 can enable the customer to indicate that no substitution is desired. This may be because the customer needs the specific item for a recipe, for example, or desired a specific color of clothing. This may also be because the customer can pick up the specific item locally, for example, or because the item was not critical or essential. If the customer touches the refusal button 708, therefore, the item can simply be dropped from the order.

In some examples, the GUI 700 can also include a "Wish List," or save, button 710. In this manner, the customer can indicate that they wish to be notified when the item has been restocked. This may be an item the customer is ordering ahead of time (e.g., for Christmas), or simply something that they keep on hand, but for which they have no immediate need. The customer can simply press the Wish List button, or text, "Save," for example, and the service provider can save that item for the customer. When the item is back in stock and/or the customer places another order, the item can simply be added to the new pick list.

The GUI 700 is shown here as a text based GUI 700, which may facilitate quick responses from the customer. In other examples, however, the GUI 700 could be part of an application ("app") that enables the customer to place, track, and substitute orders in a single app. The app can have a similar GUI 700 for soliciting substitutions from the customer, but may simply be embedded in the app as a component thereof.

While several possible examples are disclosed above, examples of the present disclosure are not so limited. For instance, while a system for substituting items during the picking process is disclosed, the system could be used in other environments without departing from the spirit of the disclosure. In addition, the location and configuration used for various features of examples of the present disclosure such as, for example, the location and configuration of the management module 102, handheld electronic device 106, and the layout of the stores can be varied according to a particular store, product line, or picker that requires a slight variation due to, for example, physical limitations, size or construction covenants, the types of items stocked, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for substituting items during a picking process, the method comprising:
   receiving an order at a management module from a customer for a plurality of items;
   creating a pick list with the management module including the plurality of items;
   sending the pick list from the management module to a handheld electronic device associated with a first picker to retrieve the plurality of items;
   receiving a substitution request at the management module from the handheld electronic device including an indication of a first item of the plurality of items that is not available, the substitution request comprising at least an image including one or more substitute items that are available;

sending the substitution request, with the image and one or more indicia added to the image, from the management module to a customer's electronic device including at least the first item and the one or more substitute items, wherein the one or more indicia added to the image correspond to and enable user selection among the one or more substitute items;

receiving a response to the substitution request at the management module from the customer's electronic device;

sending a modified version of the image depicting a user selection among the one or more substitute items from the management module to the handheld electronic device.

2. The method of claim 1, wherein receiving the response from the customer's electronic device comprises receiving a user selection of one of the one or more indicia.

3. The method of claim 1, wherein receiving the response to the substitution request at the management module from the customer's electronic device comprises receiving the modified version of the image including an indicator to depict the user selection of one of the one or more substitute items depicted in the image.

4. The method of claim 1, wherein receiving the substitution request at the management module from the handheld electronic device further comprises:

receiving, at the management module, bar code information from a bar code scanner of the handheld electronic device related to at least one of the first item or the one or more substitution items.

5. The method of claim 4, wherein the indication of the first item that is not available comprises a difference within the bar code information between first bar codes on the plurality of items and second bar codes on shelves holding the plurality of items.

6. The method of claim 1, wherein the one or more indicia added to the image comprise approximate outlines around each of the one or more substitute items.

7. A non-transitory computer-readable storage medium having computer-executable instructions stored thereupon which, when executed by a computer, cause the computer to:

receive an order at a management module from a customer for a plurality of items;

create a pick list with the management module including the plurality of items;

send the pick list from the management module to a handheld electronic device associated with a first picker to retrieve the plurality of items;

receive a substitution request at the management module from the handheld electronic device including an indication of a first item of the plurality of items that is not available, the substitution request comprising at least an image including one or more substitute items that are available;

send the substitution request, with the image and one or more indicia added to the image, from the management module to a customer's electronic device including at least the first item and the one or more substitute items, wherein the one or more indicia added to the image correspond to and enable user selection among the one or more substitute items;

receive a response to the substitution request at the management module from the customer's electronic device; and send a modified version of the image depicting a user selection among the one or more substitute items from the management module to the handheld electronic device.

8. The non-transitory computer-readable storage medium of claim 7, wherein receiving the response from the customer's electronic device comprises receiving a user selection of one of the one or more indicia.

9. The non-transitory computer-readable storage medium of claim 7, wherein to receive the response to the substitution request at the management module from the customer's electronic device comprises to receive the modified version of the image including an indicator to depict the user selection of one of the one or more substitute items depicted in the image.

10. The non-transitory computer-readable storage medium of claim 9, wherein the indicator comprises a marker on the modified image, wherein the marker is formed via a touch screen.

11. The non-transitory computer-readable storage medium of claim 7, wherein to receive the substitution request at the management module from the handheld electronic device further comprises to:

receive, at the management module, bar code information from a bar code scanner of the handheld electronic device related to at least one of the first item or the one or more substitution items.

12. The non-transitory computer-readable storage medium of claim 11, wherein the indication of the first item that is not available comprises a difference within the bar code information between first bar codes on the plurality of items and second bar codes on shelves holding the plurality of items.

13. The non-transitory computer-readable storage medium of claim 7, wherein the one or more indicia added to the image comprise approximate outlines around each of the one or more substitute items.

14. A system, comprising:
one or more processors; and
at least one non-transitory computer-readable storage medium having instructions stored thereupon which, when executed by the one or more processors, cause the apparatus to:

receive an order from a customer for a plurality of items;

create a pick list including the plurality of items;

send the pick list to a handheld electronic device associated with a first picker to retrieve the plurality of items;

receive a substitution request from the handheld electronic device including an indication of a first item of the plurality of items that is not available, the substitution request comprising at least an image including one or more substitute items that are available;

send the substitution request, with the image and one or more indicia added to the image, to a customer's electronic device including at least the first item and the one or more substitute items, wherein the one or more indicia added to the image correspond to and enable user selection among the one or more substitute items;

receive a response to the substitution request from the customer's electronic device; and send a modified version of the image depicting a user selection among the one or more substitute items to the handheld electronic device.

15. The system of claim 14, wherein receiving the response from the customer's electronic device comprises receiving a user selection of one of the one or more indicia.

16. The system of claim 14, wherein to receive the response to the substitution request from the customer's electronic device comprises to receive the modified version of the image including an indicator to depict the user selection of one of the one or more substitute items depicted in the image.

17. The system of claim 16, wherein the indicator comprises a marker on the modified image, wherein the marker is formed via a touch screen.

18. The system of claim 14, wherein to receive the substitution request from the handheld electronic device further comprises to:
receive bar code information from a bar code scanner of the handheld electronic device related to at least one of the first item or the one or more substitution items.

19. The system of claim 18, wherein the indication of the first item that is not available comprises a difference within the bar code information between first bar codes on the plurality of items and second bar codes on shelves holding the plurality of items.

20. The system of claim 14, wherein the one or more indicia added to the image comprise approximate outlines around each of the one or more substitute items.

* * * * *